3,345,322
PLASTIC SURFACE COVERING MATERIAL CONTAINING METALLIZED PLASTIC PARTICLES
William Mayo Smith, Wilton, Conn., assignor to Escambia Chemical Corporation, Pace, Fla., a corporation of Delaware
No Drawing. Filed Oct. 29, 1964, Ser. No. 407,548
13 Claims. (Cl. 260—41)

This invention relates to novel decorative surface covering compositions. More particularly, the present invention involves rigid or flexible self-supporting resinous surface covering materials incorporating rigid or flexible decorative metalized resin particles.

The process of vacuum coating transparent plastic, such as vinyl film or polyethylene terephthalate in film form (Mylar, a trade name) to produce a metal coated sheet is well known as disclosed, for example, in U.S. Patent No. 2,993,806, of E. M. Fisher et al. It has also been known heretofore in the plastics field to produce resinous surface covering materials incorporating decorative effects made of metal in particulate form. It has, for example, become popular in recent years to incorporate flakes of aluminum in floor tiles. The aluminum flakes are sometimes anodized or lacquered to give different colors. The effect is a light-reflective metallic sparkle or, particularly in soft light, simply a metallic decorative effect. Small squares of metalized polyethylene terephthalate (Mylar) sheets in which the sheet is coated with a monomolecular surface of metal which is placed on the sheet by known vacuum coating techniques have been considered. Both the aluminum and metalized Mylar produce a product of limited utility. The aluminum has static properties which cause the flakes to attach to some of the equipment in processing the material. The most significant difficulty, however, encountered with both metal and coated Mylar particles, for providing a metal flake effect is that reuse of the scrap or excess plastic sheet or matrix in which the particles are embedded is not feasible while failure to effect reuse of these materials markedly increases the cost of the material actually used. The use of metallic (aluminum) chips when used for glitter deposit in recesses of mills, calendars, etc., and deposit on bearings and can cause contamination of subsequent runs where such glitter is not desired. Mylar glitter can behave similarly. There has developed, therefore, prior to the present invention, a well-defined need for surfacing film compositions incorporating decorative flake effects which permits reuse of the recovered waste or excess material as a clear or pigmented film in which the metalized flakes are so disseminated as to not be visually apparent. This need is a significant one since large quantities of material often become damaged or are otherwise rendered unsuitable for the purpose for which they were originally processed. The compositions of the invention meet this need in a manner which is remarkably simple and economical.

Important applications of this invention thus involve the incorporation of flakes or chips or particles of monomolecular metalized plastic of relatively low softening point in surface covering compositions for use in floors, walls and the like, as indicated above. Excess or defective surface covering materials prepared in this manner can then be fed to and masticated in a Banbury or other mixer, and milled, extruded or pressed at temperatures sufficient to fuse the plastic sheet and the plastic component of the metalized particles, causing the distribution of the metalized coating of the plastic particles throughout the excess recovered plastic mass as a result of which the metalizing component is no longer visible and new film of unmodified clear, transparent or otherwise completely different appearance may be produced.

It has been suggested in U.S. Patent No. 2,986,198 of L. G. Kolker et al. that metal flakes may be coated with a thermoplastic material, specifically, copolymers of vinyl chloride and vinyl acetate, and incorporated in a granulated surface covering composition prior to its processing to form a linoleum or other coating. The waste accrued from this process, it is stated, can be reprocessed so that the metal particles are ground with the remainder of the coating composition to form a unitary mass wherein the metallic constituents are not visible. The disappearance of the metallic components in this procedure may of course be found to occur in an opaque material such as linoleum but it is not known to occur where a translucent or transparent composition is involved. Furthermore, there is a marked tendency on the part of metallic granules in plastic matrices to migrate to the surface of the mass in which they are embedded. This propensity is an obvious one where each of the metal flakes is released from its plastic coating when it is this coat which by adherence to both the metallic core particle and the surrounding surface coating composition stabilizes the metallic particles in the surface coating matrix.

In the present invention the problems of adherence and migration are removed. In the surface coating contemplated by the invention wherein the decorative metalized plastic or resin particles are present, the physical properties of the individual particles, such as density, while somewhat different from the properties of the surrounding plastic matrix, are still sufficiently consistent with those of the matrix to eliminate the problem of migration. In the waste or excess, the particles are fused during reprocessing with the remainder of the coating mass and no longer occur in particulate form.

The metalizing coating in turn is so deposited on the plastic or resin particles as to fail of attaining a granular state. Thus, its diffusion in reprocessing of defective or excess sheet material is readily secured without concern for granule formation of the metal coating with the accompanying problems of migration and visual appearance.

The resin employed in forming each of the metalized particles in the practice of the present invention is such that it has a softening point sufficiently low so as to blend with the surrounding matrix at the temperatures employed in reprocessing of the excess or waste sheet material. In this manner smearing or marbling of the reprocessed plastic is avoided such as would occur where plastic particles such as Mylar having a high softening point are employed.

It is, accordingly, an object of the present invention to provide an economical and simply produced plastic surface covering material containing metalized particles for decorative effect.

It is also an object of the present invention to provide a novel self-supporting plastic surface covering containing metalized resin particles which can be readily reprocessed to effect their disappearance.

Other objects of the present invention will be apparent to those skilled in the art from reading the present specification.

This invention results therefore from the discovery that metal coated particles of thermoplastic resin can be incorporated in a flexible or rigid thermoplastic resin matrix in which the particles, upon reprocessing of the resin matrix, will substantially disappear even where the resin matrix is clear or transparent; the metallic coated particles being miscible with, and fusing or dissolving in the resin of the matrix when the mixture is milled at a temperature below the decomposition point of the composite mass of matrix resin and metalized resin particles. In the case of polyvinyl chloride resins, this is a temperature below the dehydrohalogenation temperature of the resin. In the case of other resins, it is a temperature at which the resin may be reworked or reprocessed, as by milling, but below the temperature at which significant decomposition may occur. While the decomposition temperature may vary substantially between various thermoplastic resins, most resins will not decompose at temperatures below about 220° C. if the time of exposure to the elevated temperature is of reasonably short duration. As used herein, and in the appended claims, the temperature of 220° C. is intended to represent a temperature at which the thermoplastic resin mass may be reworked without undue decomposition. Preferably, the metallic coated particles shall have a softening point between about 90° C. and 205° C. After reworking the metallic coating of the particles is substantially imperceptible.

The matrix providing the self-sustaining sheet or film may be composed of a vinyl resin, methacrylate, polystyrene, polyolefin or other compatible resins. The resin of the metalized particles is also a thermoplastic resin such as a polyester, illustratively polycarbonate; a polyacrylic acid ester, for example, polymethyl methacrylate, polymethacrylate; a polyolefin such as polypropylene or polyethylene; polystyrene; copolymers such as acrylonitrile-butadiene-styrene terpolymer or, most desirably, vinyl resin, as well as mixtures of the foregoing resins. Illustrative vinyl resins which are preferred for use both in the matrices and metalized particles of the invention are vinyl halide homopolymers such as polyvinyl chloride and vinyl halide copolymers such as vinyl chloride-vinyl acetate copolymer. Other examples of vinyl resins which are useful in the practice of the invention are vinyl chloride-vinylidene chloride copolymer, polyvinylidene chloride, polyvinyl fluoride, polyvinylidene bromide and their polyvinyl acetate copolymers. The preferred softening temperature range for resins used in the matrix film are from about 90° C. to 205° C., although temperatures of up to 200–220° C. are satisfactory.

Preferably, but not necessarily, the resins of the metalized particles have softening points at least as high as those of resins forming the matrix in which the particles are embedded. The difference in softening points is not important and they may vary widely and may be the same. The plastic film or sheet constituting the matrix when comprising polyvinyl chloride desirably contains a plasticizer to provide the requisite flexibility. Standard plasticizers for use in these sheets or films are monomeric esters such as the phthalates, adipates and organic phosphates, illustratively and most desirably, dioctyl phthalate, or octyl decyl phthalate (Herecoflex 150, a trade name), dimethyl phthalate, dicapryl phthalate, dimethoxyethyl phthalate, dibutyl phthalate, dibutoxyethyl phthalate, tricresyl phosphate, diphenyl cresyl phosphate, tributyl phosphate, trioctyl phosphate, diphenyl adipate, dioctyl adipate, dibutyl adipate and the like, all of which are normally high boiling. Polyesters such as polypropylene glycol adipate may also be employed but are normally less preferred.

The metalized particles employed herein are prepared by cutting into desired shapes plastic sheet material the opposite surfaces of which have been metalized by vacuum coating techniques such as those disclosed in U.S. Patent No. 2,665,223 of P. J. Clough et al., U.S. Patent No. 2,665,224 of P. J. Clough et al., U.S. Patent No. 2,665,228 of R. A. Stauffer, U.S. Patent No. 2,971,862 of C A. Baer et al., and U.S. Patent No. 3,040,702 of A. Eng et al.

The amount of plasticizer used in the resin of the decorative particles is usually restricted because of their normally high vapor pressures, which cause them to volatilize during the vacuum metalizing process. The volatile plasticizers collide with the metallic vapor impairing the coating process.

The resin particles employed in the decorative films of the invention are normally coated with any of a number of metals such as, for example, gold, copper, zinc, cadmium, silver or aluminum. The aluminum can also be anodized to present various colorations, e.g., green or gold.

Metalized particles may, if desired, be coated additionally with a suitable colored lacquer or a dye impregnated plastic coating. Illustratively, a resin particle vacuum coated with aluminum may be further coated, optionally, with a gold lacquer.

The metalized particles are usually produced as squares having a lateral measurement of less than about 1/16 inch and preferably of about 1/64 inch. Metalized particles or chips of larger or smaller dimensions and of different conformation can also be utilized in the practice of the invention but are less preferred.

The metalized particles may be desirably employed in a weight relation to the resin composition of the matrix of one part of metallic coated resin particles to 100 to 3000 parts or more of matrix composition and preferably in a proportion of 1 to 1000, respectively. However, the amounts employed may vary over a very wide range depending upon the visual appearance desired. For some visual effects, extremely small amounts of particles may be employed.

The resin of the decorative particles is usually produced to have a thickness of .0002 inch to 0.3 inch or thicker and preferably about 0.005 to 0.1 inch, although the thickness may vary over a wide range depending upon the preference of the manufacturer.

The metal deposited by vacuum coating on the rigid resin formed as a flat film by extrusion or less desirably by pressing, prior to cutting into desired shapes, is desirably within the range of 1/1,000,000 inch to 3/1,000,000 inch in thickness and preferably at the lower or thinner end of this range. In any event, the combined thickness of metalizing coating and resin nucleus and whatever additional coating is included on the decorative particles is less than the thickness of the plastic film on which the particles are disposed.

The matrix in which the decorative metalized flakes or particles are embedded may have any desired thickness although usually a thickness of from 0.05 inch to 0.5 inch will suffice.

The rigid metalized flakes or particles may contain standard stabilizers in addition to a small amount of plasticizer.

The resin composition from which the plastic film matrix is prepared can contain in addition to plasticizers and stabilizers, fillers in the form of clays or calcium carbonate, pigments and the like.

Many of the stabilizers and pigments which can be employed in producing the standard polymer blends used in the practice of the invention are proprietary materials whose exact compositions are not published. These recognized materials often called compounding agents, are employed for their well known properties, and practice of the present invention does not require the use of these particular materials. These materials are, however, readily available from the various manufacturers, and their sources and natures are listed in Table I below:

TABLE I. COMPOUNDING AGENTS

PRODUCTS OF R. T. VANDERBILT COMPANY, NEW YORK, N.Y.

Vanstay HTA, a barium-cadmium stabilizer
Vanstay PX–29, a phosphite stabilizer
Vanstay RR–Z, a barium-cadmium-zinc stabilizer.

PRODUCTS OF FERRO CHEMICAL COMPANY (FORMERLY HARSHAW CHEMICAL COMPANY), BEDFORD, OHIO

Harshaw 12–V–6, a barium-cadmium stabilizer (an alkyl-aryl phosphite complex)
Harshaw 7–V–2, an organic epoxy stabilizer.

PRODUCTS OF SYNTHETIC PRODUCTS CO., CLEVELAND, OHIO

Sympron 543-R (a barium-cadmium stabilizer).

METAL & THERMIT CORPORATION, RAHWAY, N.J.

Thermolite 31, an organotin mercaptide stabilizer.

DOW CORNING CORPORATION, MIDLAND, MICH.

DC 200, silicone mold release agent.

ROHM & HAAS COMPANY, PHILADELPHIA, PA.

Paraplex G-62, epoxidized soy-bean oil plasticizer-stabilizer.

CARDINAL CHEMICAL COMPANY, COLUMBIA, S.C.

Stabilizer 161M, organo tin stabilizer
Stabilizer 4696, clear liquid stabilizer
Cardinal Clear No. 2, organo tin, non-staining maleate-laurate type stabilizer.

CLAREMONT POLYCHEMICAL CORPORATION, ROSLYN HEIGHTS, N.Y.

Claremont D-10 pigment, opaque blue color paste
Claremont D-12 pigment, opaque yellow color paste
Claremont D-15 pigment, opaque green color paste
Claremont D-16 pigment, opaque white color paste
Claremont D-19 pigment, opaque black color paste
Claremont 6754 pigment, green color paste.

PRODUCTS OF ARGUS CHEMICAL CORP., BROOKLYN, N.Y.

Drapex 4.4—an epoxidized oil plasticizer-stabilizer.

The particle size of the vinyl resin in the blends that are used to prepare the films and metalized particles of this invention are not critical. Particle size can range from very large where a major portion of the resin is retained on 40- and 80-mesh screen to very fine where the resin passes a 140-mesh screen.

In order more clearly to disclose the nature of the present invention, the following examples illustrating the invention are provided. It should be understood, however, that this is done solely by way of example and is intended neither to delineate the scope of the invention nor limit the ambit of the appended claims. In these examples all parts are parts by weight.

*Example 1*

The resins of the following formulations were prepared as free flowing dry blends. The listed ingredients, in each instance, were blended for five minutes at room temperature in a steam jacketed ribbon blender. Blending was continued with steam at 15 p.s.i.g. applied to the jacket of the blender. Blending was continued until the mixture atained a temperature of 60° C. to 120° C. and subsequently cooled to room temperature.

The metalized particles were prepared from a masticated rigid film produced at a thickness of 0.002 inch by standard flat-film extrusion. The formulation from which this film was prepared was as follows:

| | Parts |
|---|---|
| Polyvinyl chloride homopolymer (Escambia 3185) (relative viscosity 1.85 determined as 1% solution in cyclohexanone at 25° C.) | 100.00 |
| Organotin mercaptide stabilizer | 3.00 |
| Stearic acid | 1.00 |

The rigid film was metalized by standard vacuum treatment to a thickness of .000001 inch. Films were prepared with aluminum untreated and anodized to gold and green. These films were masticated to provide metalized particles which were thoroughly mixed with the resin formulation providing the matrix in which the particles were to be embedded. The formulation providing the vinyl matrix was a free flowing dry blend of the following composition:

| | Parts |
|---|---|
| Polyvinyl chloride homopolymer (Escambia PVC 1200) (relative viscosity 1.20 determined as 1% solution in cyclohexanone at 25° C.) | 100.00 |
| Dioctyl phthalate | 20.00 |
| Polymeric plasticizer (Paraplex G-62) | 5.00 |
| Barium-cadmium stabilizer (an alkyl aryl phosphite complex, Harshaw 12-V-6) | 2.00 |

The metalized particles or chips were thoroughly mixed with the matrix composition. A compression mold was filled with this blend and press polished to provide tiling. The press was operated at 171° C. After the matrix composition containing the metalized particles was fused in the press the press platens were cooled to room temperatures and the product vinyl tile was removed from the mold.

The product tile thus obtained is then cut in half and one half of this tile is milled at 171° C. for five minutes. The metallized particles dispersed throughout the sheet disappear in the resin composition of the original matrix during this period to yield a clear composition and film material.

*Example 2*

(a) The following formulation was prepared as a hot dry blend in the laboratory Hobart mixer:

| | Parts |
|---|---|
| Polyvinyl chloride homopolymer (relative viscosity 1.20 determined as a 1% solution in cyclohexanone at 25° C.) | 100.00 |
| Dioctyl phthalate | 20.00 |
| Drapex 4.4 | 5.00 |
| Harshaw 12-V-6 | 2.00 |
| Stearic acid | .50 |

Eighty grams of the dry blend were blended with one gram of rigid unanodized aluminum metalized polyvinyl chloride flakes prepared as described in Example 1. The resulting mixture was placed in a mold the dimensions of which were 6 inches x 6 inches x 0.080 inch, and pressed at 171° C. The press cycle was three minutes at contact pressure and six minutes at 25 tons. The product tile or plaque was thereafter removed from the mold.

(b) The metallized vinyl tile plaques prepared in Example 2(a) were cut in half and one half was milled at 171° C. for 5 minutes. The metallized resin particles dispersed throughout the sheet disappeared during this period.

*Example 3*

The procedure of Example 2(a) was followed except that when the product plaques or tiles containing the embedded metallized particles were formed, they were cut in half and one half was milled for five minutes at 160° C. to determine whether the metallized particles could be milled to form a clear sheet.

The particular resin compositions employed in the metallized sheet material from which the metallized particles were derived varied in certain instances as did the thickness of the sheet as indicated in Table II below:

TABLE II

| Example | Metalized Sheet Material | Thickness (inches) |
|---|---|---|
| 3(a) | Polyvinyl chloride homopolymer | .0085 |
| 3(b) | ____do____ | .0157 |
| 3(c) | ____do____ | .0282 |
| 3(d) | Polymethacrylate homopolymer | .0062 |
| 3(e) | Polystyrene | .0062 |
| 3(f) | Polyethylene | .0062 |

In those tiles milled for five minutes at 160° C. the metallized particles prepared from the sheets of Table II disappeared. With the preferred metallized vinyl resins of Examples 3(a), 3(b) and 3(c), the disappearance of the metallized particles during the milling phase into the matrix material was complete and the milled sheet retained its gloss throughout the pressing cycle.

The disappearance of the metallized particles during the milling step was also complete in Example 3(d) where polymethacrylate was used. The metallized polyethylene and the polystyrene particles of Example 3(e) disappear as particles but give a slightly opaque, cloudy or milky appearance to the milled sheet.

When the metallized particles employed in Examples 3(a) through 3(f) were replaced by aluminum flake and metallized Mylar particles, these two materials did not disappear when the tiles were milled at any temperature.

*Examples 4 through 6*

In the examples which follow the sheets were prepared as follows:

The matrix polymers were separately milled at 170° C. for 5 minutes and milled into sheets about 0.03 inch thick. Aluminized polyvinyl chloride chips of the composition of the chips in Example 1, but precut into ⅛ inch cubes were placed between 4 sheets of the matrix polymers. The assembly was pressed in a mold having a temperature of 175° C. The pressing cycle was 3 minutes at contact pressure and 5 minutes at 20 tons pressure. When the resulting sheets were milled at 170° C. for 5 minutes, the metallized resin chips diffused throughout the mass and were imperceptible. In each example the matrix resin consisted of the following:

| Example No.: | Matrix resin |
|---|---|
| 4 | Polymethylmethacrylate. |
| 5 | Polyethylene. |
| 6 | Polystyrene. |

*Examples 7 through 9*

Examples 4 through 6 were repeated, except that the matrix resin and the resin of the aluminized cubes used in each example was the same. Thus the resin employed in each example was as follows:

| Example No.: | Resin of both the matrix and the aluminum cube |
|---|---|
| 7 | Polyethylene. |
| 8 | Polystyrene. |
| 9 | Polymethylmethacrylate. |

When each of the products of Examples 7 through 9 was milled at 170° C. for 5 minutes, the metallized resin chips diffused throughout the mass and became imperceptible.

Some resins are not compatible with other resins in the sense that they will not blend with each other in the fused state. Thus vinyl resins do not readily blend, when fused, with polymethacrylate, polyolefin, and certain other resins. Since it is desirable that the resins of the matrix and the metallized resin particles blend with each other when fused during reworking, compatible resin systems are desirably employed. When a resin presents a compatibility problem it is preferable to employ the same resin in both the metallized particles and in the matrix, as shown in Examples 7 through 9.

The terms and expressions employed are used as terms of description and not of limitation, and it is not intended, in the use of such terms and expressions, to exclude any equivalents of the features shown and described or portions thereof, but it is recognized that various modifications are possible within the scope of the invention claimed.

What is claimed is:
1. A decorative self-sustaining film that comprises a thermoplastic resin matrix and dispersed therein decorative, visible, metallic vacuum coated thermoplatic resin particles having a softening point of less than about 220° C., the resin of said particles having a greater rigidity and a softening point higher than that of the resin of said matrix, said particles being miscible with and dissolving in said matrix when said film is milled at a temperature of up to about 220° C., the metallic coating of said particles being so diffused in the resulting composition as to be substantially imperceptible; wherein the metallic vacuum coated thermoplastic resin particles shall constitute about one part by weight of each 100 to 3,000 parts or more of said matrix and said metallic coating of said metallic vacuum coated thermoplastic resin particles has a thickneess of from about ¼,000,000 inch to about ¾,000,000 inch and wherein said metallic coated thermoplastic resin particles have a thickness of about 0.0002 inch to 0.3 inch.

2. A decorative self-sustaining film that comprises a polymeric vinyl halide matrix and dispersed therein decorative, visible, metallic coated thermoplastic resin particles in a ratio by weight of 100 to 3,000 parts or more of the composition of said matrix to 1 part by weight of said particles, the resin of said particles having a greater rigidity and a softening point higher than that of the resin of said matrix and having a softening point of less than about 220° C., said particles being miscible with, and dissolving in, said matrix when said film is milled at a temperature of up to about 220° C.; the metallic coating of said particles being so diffused as to be substantially imperceptible in the resulting milled composition; and wherein said metallic coating of said metallic coated thermoplastic resin particles has a thickness of from about ¼,000,000 inch to about ¾,000,000 inch and wherein said metallic coated thermoplastic resin particles have a thickness of about 0.0002 inch to 0.3 inch.

3. A decorative self-sustaining film that comprises a polymeric vinyl chloride resin having dispersed therein decorative, visible, aluminum coated thermoplastic resin particles wherein the metallic coating has a thickness of about ¼,000,000 inch to about ¾,000,000 inch; the resin of said particles having a greater rigidity and a softening point higher than the softening point of the resin of said matrix and below 220° C.; said particles being miscible with, and fusing with said matrix when said film is milled at a temperature of up to about 220° C., the metallic coating of said particles being so diffused as to be substantially imperceptible in the resulting milled composition; and wherein said aluminum coated thermoplastic resin particles shall constitute about one part by weight for each 100 to 3,000 parts by weight of the polymeric vinyl chloride resin matrix and wherein said aluminum coated thermoplastic resin particles have a thickness of 0.0002 inch to 0.3 inch.

4. A decorative self-sustaining film that comprises a vinyl chloride homopolymer, said homopolymer comprising a matrix having a softening point of 90° to 205° C. and dispersed in said matrix, decorative, visible, opaque aluminum coated thermoplastic resin particles; the resin of said particles being selected from the group consisting of polyvinyl chloride, polymethacrylate, polystyrene and polyethylene, the resin of said particles having a softening point higher than the softening point of the resin of said matrix; said particles being miscible with, and dissolving in, said matrix when said film is masticated and milled at a temperature of up to about 205° C.; the metallic coating of said particles being so diffused as to be substantially imperceptible in the resulting milled composition; wherein the aluminum vacuum coated thermoplastic resin particles shall constitute about one part by weight of each 100 to 3,000 parts or more of said matrix and said aluminum coating of said aluminum vacuum coated thermoplastic resin particles has a thickness of from about ¼,000,000 inch to about ¾,000,000 inch and wherein said metallic coated thermoplastic resin particles have a thickness of about 0.0002 inch to 0.3 inch.

5. A film in accordance with claim 1 wherein the resin of the particles is polyvinyl chloride.

6. A film in accordance with claim 1 wherein the resin of the particles is polymethacrylate.

7. A film in accordance with claim 1 wherein the resin of the particles is polystyrene.

8. A film in accordance with claim 1 wherein the resin of the particles is polyethylene.

9. A film in accordance with claim 1 wherein the thermoplastic resin of the matrix is polyvinyl chloride.

10. A film in accordance with claim 1 wherein the thermoplastic resin of the matrix is a polyolefin.

11. A film in accordance with claim 1 wherein the thermoplastic resin of the matrix is polyethylene.

12. A film in accordance with claim 1 wherein the thermoplastic resin of the matrix is polystyrene.

13. A film in accordance with claim 1 wherein the thermoplastic resin of the matrix is polymethylacrylate.

References Cited

UNITED STATES PATENTS 2,947,646   8/1960   Devaney et al.

MORRIS LIEBMAN, *Primary Examiner.*
ALLAN LIEBERMAN, *Examiner.*